United States Patent

Fujimoto

[11] Patent Number: 6,081,755
[45] Date of Patent: *Jun. 27, 2000

[54] VEHICLE CONTROL DEVICE

[75] Inventor: Takanori Fujimoto, Tokyo, Japan

[73] Assignee: Mitsubishi Denki Kabushiki Kaisha, Tokyo, Japan

[*] Notice: This patent is subject to a terminal disclaimer.

[21] Appl. No.: 08/978,626

[22] Filed: Nov. 25, 1997

[30] Foreign Application Priority Data

Jul. 24, 1997 [JP] Japan ................................ 9-198718

[51] Int. Cl.$^7$ .......................... G05D 1/00; G06F 17/00
[52] U.S. Cl. .............................. 701/1; 701/35; 701/115
[58] Field of Search .................................. 701/1, 29, 33, 701/35, 115; 340/825.31, 825.44, 825.69; 73/117.3; 123/396; 714/31, 46

[56] References Cited

U.S. PATENT DOCUMENTS

| Re. 31,582 | 5/1984 | Hosaka et al. | 701/29 |
| 5,406,484 | 4/1995 | Wurzenberger | 455/456 |
| 5,638,272 | 6/1997 | Minowa et al. | 701/1 |
| 5,717,387 | 2/1998 | Suman et al. | 340/825.31 |
| 5,828,977 | 10/1998 | Hayashi et al. | 701/115 |

Primary Examiner—Jacques H. Louis-Jacques
Attorney, Agent, or Firm—Sughrue, Mion, Zinn, Macpeak & Seas, PLLC

[57] ABSTRACT

A vehicle control device has an PROM with a first and second memory area. The contents of the PROM are updated by erasing locations for a vehicle control program, writing part of the vehicle control program into the PROM, checking for abnormalities in the writing process, and then writing the remaining part of the vehicle control program into the PROM only when the result of writing the part first is determined not to have been abnormal. This determination may be based on a checksum, of the program codes that were expected to have been written into the first memory area as the first part of the vehicle control program, compared with the checksum of the program codes actually written. In the event of an abnormality, only the part of the vehicle control program first written is in the PROM, and the area in which the remaining part of the vehicle control program would have been written remains erased. The remaining part of the vehicle control program is a part of the program necessary for proper functioning, such as the reset vector. If the reset vector of the vehicle control program is used as the remaining part, and the remaining part is not written due to the detection of an abnormality, then any attempt to execute the abnormally updated control program will result in performance that is manifestly abnormal and easy to detect in subsequent production steps.

14 Claims, 5 Drawing Sheets

VEHICLE CONTROL DEVICE

BACKGROUND OF THE INVENTION

1. Field of the Invention

The present invention relates to a vehicle control device for engine control, transmission control, or the like for arithmetically processing a control amount according to a control program by using a microcomputer and, more particularly, to a vehicle control device in which a memory for storing a control program can be updated while being incorporated in the control device.

2. Description of the Related Art

Since a vehicle control device is generally under severe conditions such as temperature or vibration, a socket, for attaching a ROM (Read-Only Memory) or the like for storing a control program for engine control, cannot be used. For this reason, a program is written in the memory by a single-purpose machine before the control device is assembled, and the memory is directly soldered on a substrate.

For example, in a vehicle control device which controls an engine (i.e., an engine control device), the contents in a ROM may need to be changed due to a mismatch between control data of respective engines in mass production or the like.

In this case, in a conventional technique, the ROM is once removed and updated, and then must be resoldered. As a result, there are problems such as an increase in number of production steps, and the degradation of the reliability of the soldered portion.

To solve the above problems, in a conventional engine control device described in Japanese Patent Publication No. 8-2556562, in a change of the contents of a ROM, a new program is written in the ROM while the ROM is attached to a substrate.

However, such a conventional device has no countermeasure against a writing defect occurring when a signal is stopped due to some factor such as the instantaneous cut-off of the operation of a line (communication signal line) in the middle of an updating operation. In a checking step following the writing operation, the ROM on which data is written must somehow be checked. For this reason, the number of operation steps increase in number, and productivity is degraded. In addition, the result of such a checking step can be overlooked.

In this case in which the result of the checking step is overlooked, it may happen the above writing defect is manifested as a control amount which is apparently abnormal under almost all operating conditions. If this happens, the overlooking of the check result in the checking step could still be detected in some step that follows the checking step. However, when the writing defect is such that there is a control amount which is abnormal under only a special condition, the overlooking of the check result cannot thereby be detected, and the defective products disadvantageously can issue to the market.

SUMMARY OF THE INVENTION

The present invention has been made to solve the above problems, and has as its object to provide a vehicle control device which can highly reliably change the contents of a ROM while the ROM is attached to a substrate.

According to one aspect of the present invention, there is provided a vehicle control device comprising storage means in which a vehicle control program is stored, and updating process means which first updates a part of the control program stored in the storage means, and updates the remaining part of the control program when the part of the control program first updated is normal, wherein an arithmetic process is performed on the basis of a vehicle drive state according to the updated control program to output a control amount. According to this arrangement, when control data must be changed for some reason, the control program can be updated without removing the storage means, the steps performed in the change of the storage means can be reduced in number, and the control program can be updated even while the vehicle control device is installed in a vehicle. An advantage of this approach is that it provides a rapid and quick countermeasure against the possible issue of defective products to market.

In addition, when a writing defect occurs for some reason in an updating operation, after the contents of the storage means are erased, a part of the control program is first written. Thereafter, only when the part of the control program first written is determined to have been correctly written, the remaining part of the control program is written. It is advantageous to make the remaining part of the control program be a minimum part of the control program required to normally operate the control device. More specifically, if the part of the control program first written cannot be correctly written, the remaining part of the control program, also referred to as the minimum part of the control program required to normally operate the control device, is not written. For this reason, the writing defect can easily be detected in the steps that follow the updating step, and defective products can be prevented from being issued to the market. This approach provides an especially effective countermeasure against the issue of defective products to market, ensuring that the control device is effective when the control program is updated while the control device is installed in a vehicle. Therefore, an advantage that the control program can be highly reliably updated can be obtained.

In one form of the invention, the storage means comprises a first memory area for storing the part of the control program first written, and a second memory area for storing the remaining part of the control program (i.e., the minimum part required to cause the control device to arithmetically process a normal control amount), and the updating process means comprises erasing means for performing an erasing process for the contents of the storage means, first writing means for performing a writing process for the first memory area after the erasing process is performed by the erasing means, collation means for checking whether a writing process is correctly performed for the first memory area after the writing process is performed by the first writing means, and second writing means for performing a writing process for the second memory area only when a result obtained by the collation means coincides with an expected value. According to this arrangement, when the control data must be changed for some reason, the control program can be updated without removing the storage means. Therefore, the steps performed in the change of the storage means can be reduced in number, and the control program can be updated even while the vehicle control device is installed in a vehicle. For this reason, the desired advantage of a rapidly-performed countermeasure against the issue of a defective product to market is achieved.

In addition, when a writing defect occurs for some reason in an updating operation, after the contents of the storage means are erased, the part of the control program first written is written in the first memory area. Thereafter, only when the part of the control program first written is correctly written, the remaining part of the control program (i.e., the minimum part required to normally operate the control device) is written in the second memory area. More specifically, if the part of the control program first written cannot be correctly written, the remaining part of the control program (i.e., the minimum part of the control program required to normally operate the control device) is not written. For this reason, the writing defect can be easily detected in the step following the updating step, and defective products can be prevented from being issued to the market. Especially in a measure against a disorder in the market, the control device is effective when the control program is updated while the control device is installed in a vehicle. Therefore, an advantage that the control program can be highly reliably updated can be obtained.

In another form of the invention, the updating process means changes the control program stored in the storage means into a copy of an updating program stored in an external device on the basis of an external command. According to this arrangement, an advantage that the control program can be more efficiently updated while the control device is installed in a vehicle can be obtained.

In a further form of the invention, the collation means is a checksum of program codes to be updated. According to this arrangement, an advantage that reliability of an updating operation can be improved can be obtained.

In a still further form of the invention, the second memory area is a memory area in which execution of the control program is started first. According to this arrangement, a writing defect can be easily detected in the step following the updating step, and an advantage that defective products can be reliably prevented from being issued to the market can be obtained.

In a yet further form of the invention, the storage means is an electrically programmable nonvolatile memory. According to this arrangement, an advantage that the control program can be efficiently updated can be obtained.

DESCRIPTION OF THE PREFERRED EMBODIMENTS

As an embodiment of a vehicle control device according to the present invention, for example, a case wherein the present invention is applied to an engine control device will be described below with reference to the accompanying drawings.

Embodiment 1

Figure 1:
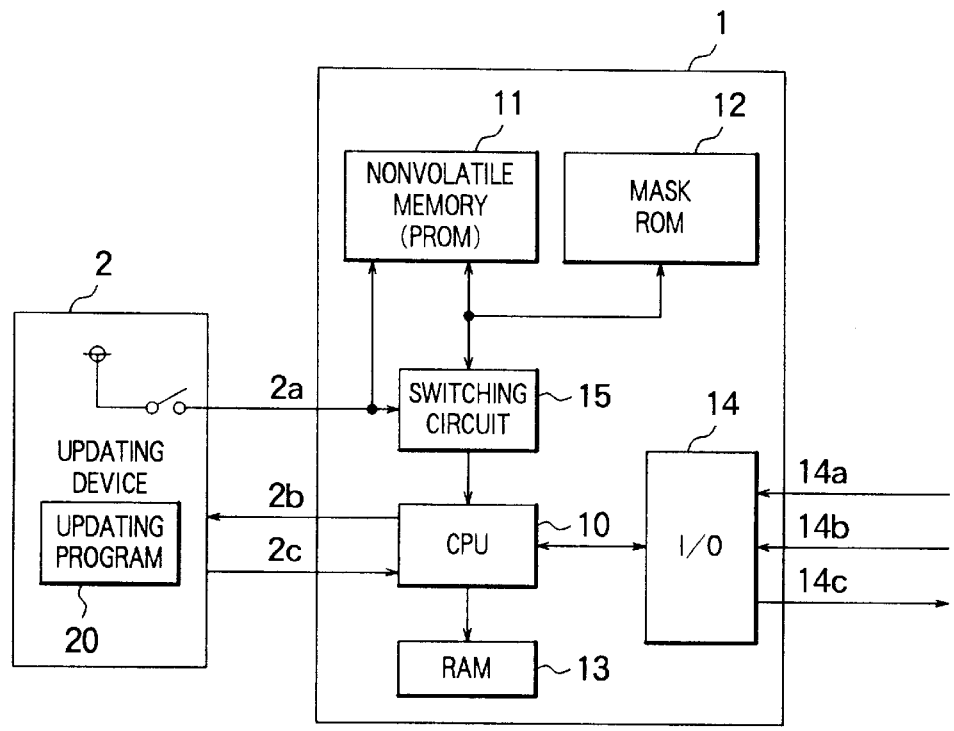
FIG. 1 is a view showing the arrangement showing an embodiment of the present invention.

FIG. 1 is a view showing the arrangement of an embodiment according t o the present invention.

Referring to FIG. 1, an engine control device 1 comprises a CPU 10 for various arithmetic operations and processes, a PROM (nonvolatile) 11 serving as an electrically erasable/writable storage means in which a control program or data is loaded on the CPU 10 to perform the arithmetic operations and processes, a mask ROM 12, which is disabled from being erased/written, in which an updating process program for updating the PROM 11 is stored, a RAM 13 for writing or reading data which is arithmetically operated and processed by the CPU 10, an I/O 14 for receiving input signals from various sensors or outputting various control signals, and a switching circuit 15 for selecting the updating process program stored in the mask ROM 12 and the control program stored in the PROM 11 on the basis of an updating signal 2a from an updating device 2 (to be described later) serving as an external device.

The updating device 2 incorporates an updating program 20 and a program for controlling this device. The mask ROM 12 of the engine control device 1 receives the updating program 20 incorporated in the updating device 2 through the switching circuit 15, the CPU 10, and a serial communication line 2c to store an updating process program for updating the PROM 11.

A serial communication line 2b is used when the CPU 10 checks the updating device 2 to determine whether the receiving operation is correctly performed, when a control signal is transmitted to the updating device 2, or the like.

A crank angle signal 14a for measuring an engine speed and an intake air amount signal 14b for measuring an amount of air taken in an engine are input to the I/O 14, a fuel injection amount to the engine is arithmetically operated by the CPU 10 on the basis of these input signals, and a control amount depending on the arithmetic result is output as a fuel injection control signal 14c through the I/O 14.

The CPU 10, the PROM 11, the mask ROM 12, the RAM 13, the I/O 14, and the switching circuit 15 are connected to each other through address/data buses.

A control program required for engine control is stored in the PROM 11, and the PROM 11 can perform an electrically erasing/writing operation. However, when the updating signal 2a is not input from the external updating device 2, the PROM 11 serves as a read-only ROM which cannot perform an erasing/writing operation. When the updating signal 2a is input, the PROM 11 serves as a ROM which can perform an erasing/writing operation.

The CPU 10, the mask ROM 12, the switching circuit 15, and the updating device 2 constitutes an updating process means.

Figure 2:
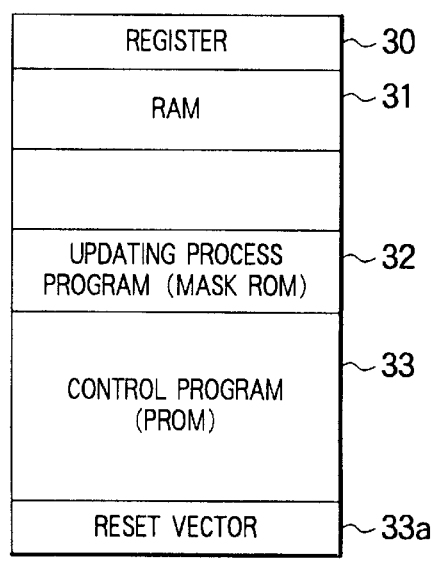
FIG. 2 is a view showing address allocation for a memory in an embodiment of the present invention.

FIG. 2 is a memory map showing address allocation for a memory included in the engine control device 1 in this embodiment. In FIG. 2, memory areas are arranged in ascending order of addresses from the top.

More specifically, a memory area 30 for various registers for switching the functions in the CPU 10, a memory area 31 for the RAM 13, a memory area 32 for the mask ROM 12 for storing an updating process program, a memory area 33 serving as a first memory area for the PROM 11 for storing a control program required for engine control, and a reset vector area 33a serving as a second memory area which is a part of the memory area 33 are sequentially arranged from the top. Upon completion of reset releasing, the CPU 10 loads an address designated by the reset vector area 33a, and the control program is executed and processed from the designated address.

The operations will be described below.

An updating process for the PROM 11 will be described below with reference to FIGS. 3 to 6.

Figure 3:
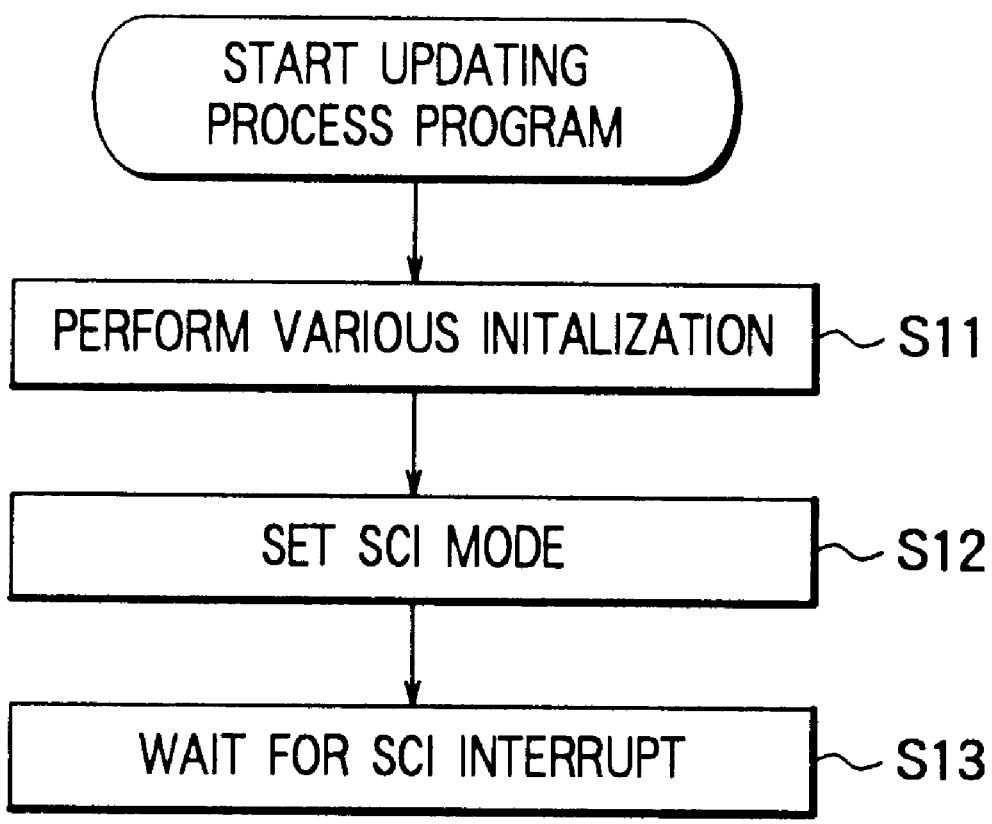
FIG. 3 is a flow chart showing an updating process in an embodiment of the present invention.

FIG. 3 is a flow chart showing the processes of the updating process program stored in the mask ROM 12 and executed when the updating signal 2a is input from the updating device 2 to the engine control device 1.

Referring to FIG. 3, various initial settings for the processes are performed in step S11, and a serial communication (SCI) mode for receiving an updating command from the updating device 2 and the updating program 20 incorporated in this device, sending a reply to the command, or the like is performed in step S12. In step S13, an external communication signal is received, a reception interrupt wait state for performing an interrupt process is set.

Figure 4:
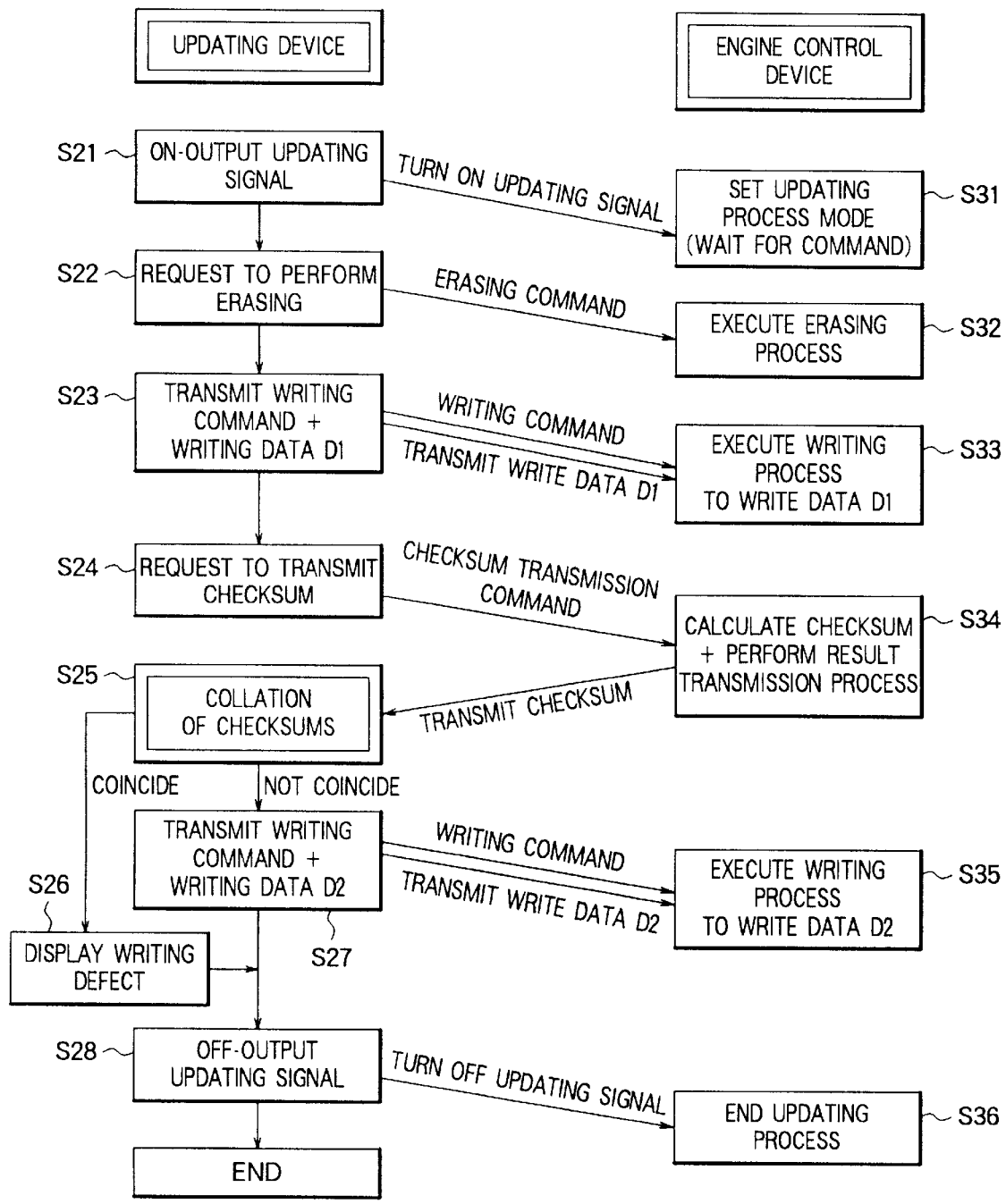
FIG. 4 is a chart showing a communication sequence for updating in an embodiment of the present invention.
Figure 5:
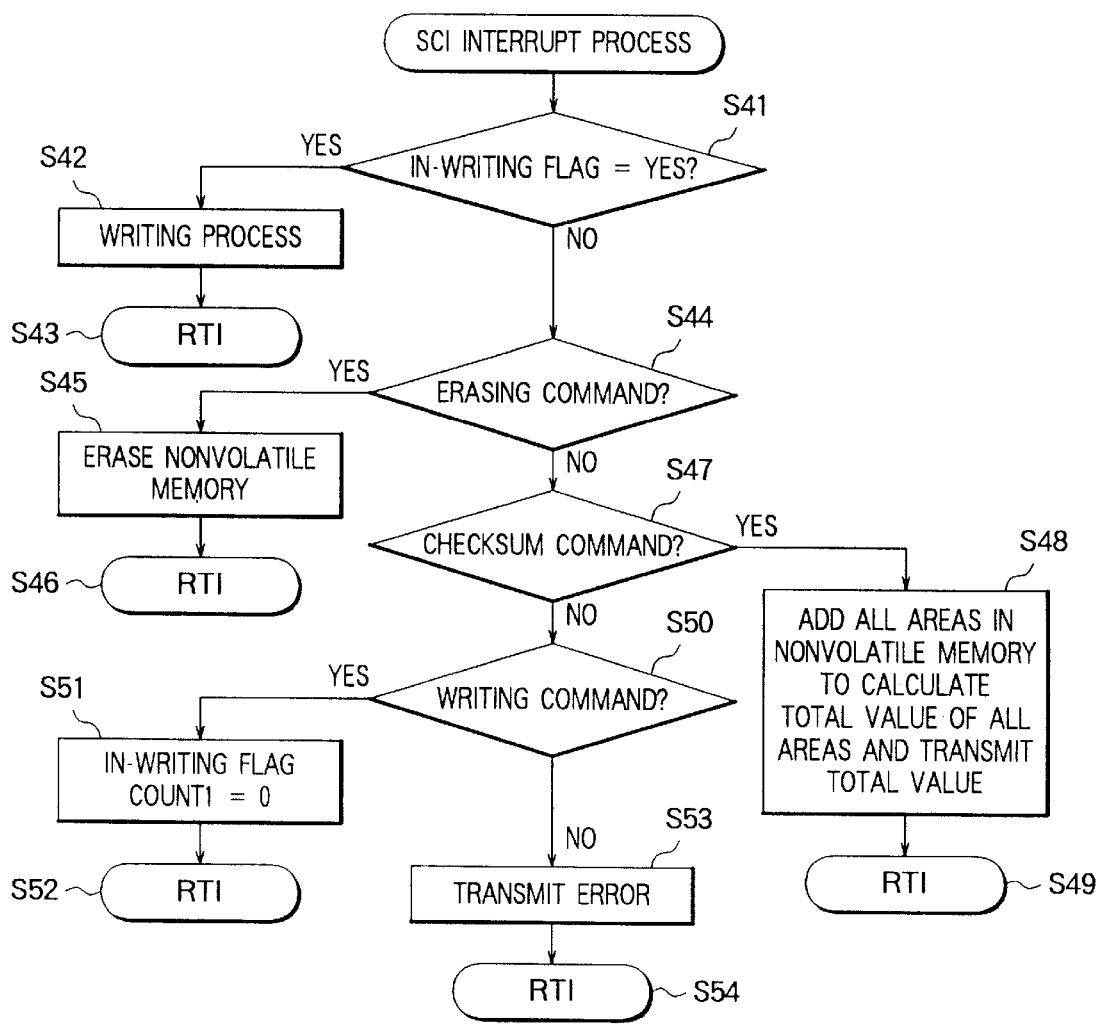
FIG. 5 is a flow chart showing an updating process using serial communication in an embodiment of the present invention.

FIG. 4 is a chart showing a communication sequence between the engine control device 1 and the updating device 2 which are used for an updating process. FIG. 5 is a flow chart showing processes executed by SCI interrupt occurring when a communication signal such as a command from the updating device 2 is received.

Referring to FIG. 4, when the updating signal 2a from the updating device 2 is ON-output in step S21, the engine control device 1 sets an updating process mode in step S31. More specifically, when the updating signal 2a is ON-output, the PROM 11 is enabled to perform an erasing/writing operation, a switching operation to the updating process program stored in the mask ROM 12 is performed by the switching circuit 15, and the CPU 10 executes the processes of the flow chart shown in FIG. 3, and then is set in an SCI interrupt wait state, i.e., a command wait state.

When the updating device 2 transmits an erasing command for erasure in step 22, the engine control device 1 executes an erasing process in step S32 (erasing means). More specifically, when the CPU 10 receives an erase command, the SCI interrupt process shown in FIG. 5 is executed. If "in-writing flag" is not YES in step S41, an erase command is recognized in step S44, contents of the PROM (nonvolatile memory) 11 is erased in step S45, and the recent interrupt process is completed in step S46.

When the updating device 2 transmits a write command for a writing operation in step S23 in FIG. 4, the engine control device 1 prepares the writing process in step S33 (first writing means), and writes first write data D1, which may be referred to as a part of a control program to be written first, and transmits D1 in a predetermined format in the PROM 11.

Here, the write data D1 corresponds to data stored in a memory area other than the reset vector area 33a of the memory map in FIG. 2, i.e., the memory area 33. More specifically, when the CPU 10 receives the write command, the SCI interrupt process (FIG. 5) is executed, the CPU 10 recognizes the write command in step S50, and the CPU 10 sets the "in-writing flag" to YES. At this time, "count 1" of a counter (not shown) included in the CPU 10 for measuring the write data number in the writing process is set to 0, and the recent interrupt is temporarily ended in step S52.

When write data transmitted after the write command, the SCI interrupt process (FIG. 5) is executed again, and the "in-writing flag" is checked in step S41 serving as the first step. However, since "in-writing flag" is set to YES during the previous SCI interrupt process, "in-writing flag =YES" is determined in step S41, and a writing process (step S42) is executed.

Figure 6:
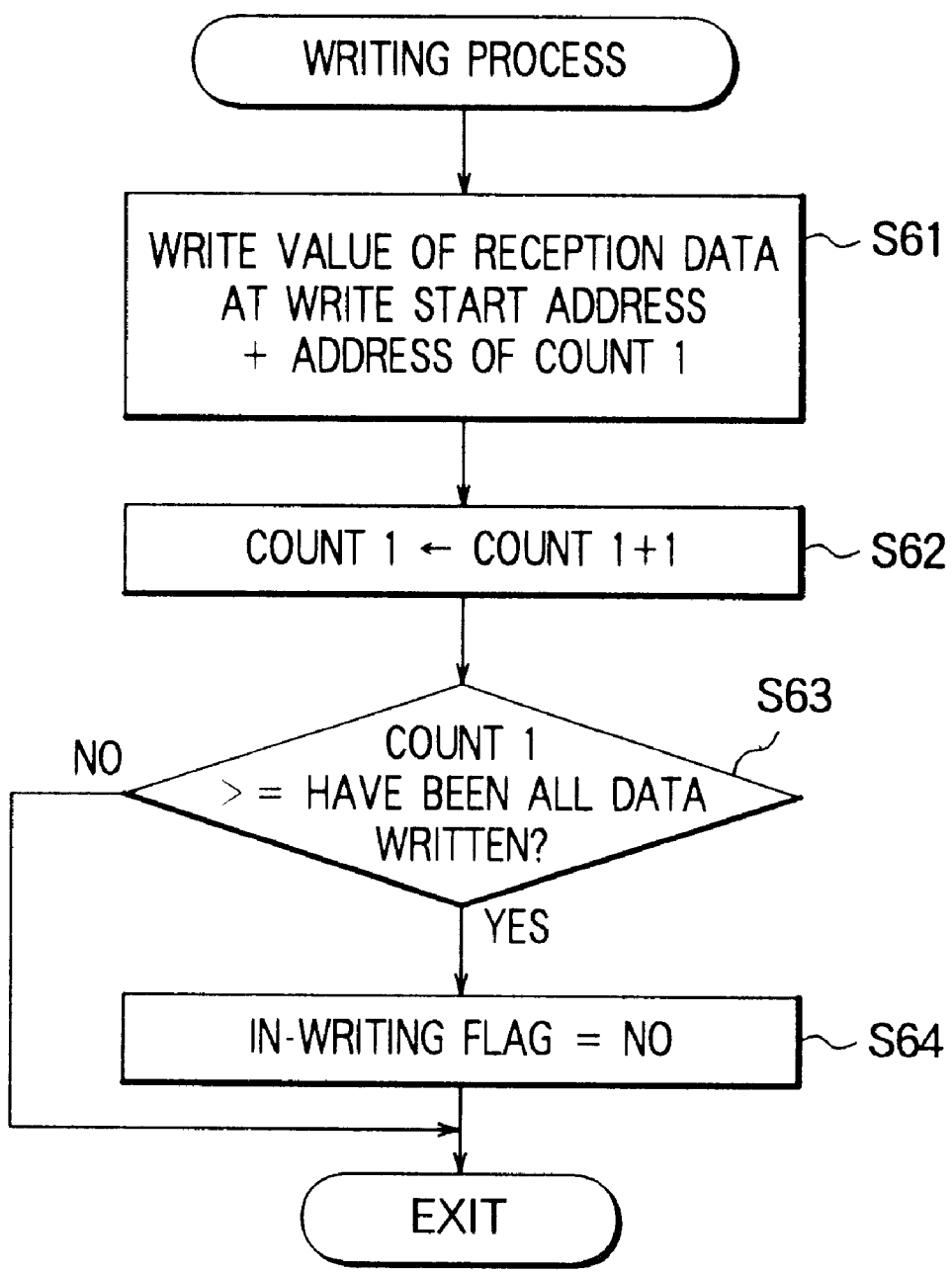
FIG. 6 is a flow chart showing a writing process in an embodiment of the present invention.

The detailed process of the writing process in step S42 will be described below with reference to FIG. 6 showing the flow chart of the writing process.

As write data, "write all data number (n)" +" write start address"+"write data D1"+ . . . +"write data Dn" are transmitted in this order.

Referring to FIG. 6, at an address of the PROM 11 obtained by adding the value of count 1 set to zero in step S51 to the "write start address" transmitted secondly in step S61, "write data D1" which is transmitted thirdly is written.

The value of count 1 is incremented in step S62, the value of count 1 is compared with "write all data number n" transmitted first in step S63. Until the value of count 1 reaches "write data number n", i.e., until all the data are completely written, the above process is repeated every time the write data is received.

In this manner, "write data" transmitted thirdly, fourthly, . . . , are sequentially written in the PROM 11.

If it is determined in step S63 that all the data are completely written, the "in-writing flag" is set to NO in step S64 to end the writing process. The "in-writing flag" is set to NO for the following reason. That is, next reception data is determined to be NO in step S41 of the SCI interrupt process (FIG. 5) executed when the data is received, and the next reception data is recognized as a next command.

Returning to FIG. 4, when the updating device 2 transmits a checksum transmission command to request a checksum in step S24, the engine control device 1 calculates the checksum and transmits the result in step S34.

More specifically, when the CPU 10 receives a checksum transmission command, the SCI interrupt process (FIG. 5) is executed, the CPU 10 recognizes a checksum command in step S47, and data in all the areas of PROM 11 is added in step S48. After the total value (checksum) is calculated, the result is transmitted to the updating device 2, and the recent interrupt process is ended in step S49.

Steps S25, S26, and S27 shown in FIG. 4 and processed by the updating device 2 are the characteristic features of this embodiment. First, the checksum which has been transmitted is calculated in advance in step S25 (collation means), and the value of the checksum collates with the design value of the stored checksum.

When the collation results coincide with each other, the same writing process as that in steps S23 and S33 described above is performed to write data D2 in steps S27 and S35 (second write means). The updating signal 2a is turned off in step S28 to end all the updating processes, and the engine control device 1 receives the OFF updating signal 2a to end all the updating processes.

Here, the updating signal 2a is the contents of the minimum control program which is required to cause the engine control device 1 to arithmetically process a normal control amount, and corresponds to data stored in the reset vector area 33a of the memory map in FIG. 2.

On the other hand, when collation results do not coincide with each other in step S25, after the updating device 2 displays writing defect in step S26, the process in step S28 described above is performed to end all the updating processes.

When the updating lines (serial communication lines 2b and 2c) are instantaneously cut off in the above processes, e.g., in the middle of writing the first write data D1, the checksum collation results do not coincide with each other in step S25. Because the intended normal data is not written in the reset vector area 33a, the areas not written stay in the state as they were when the erasing process was executed (all "1") in step S32. As a result, an address at which execution of the control program is started is not normally designated after the CPU 10 releases the reset state, and the engine control device 1 will therefore output an apparently abnormal control amount.

Referring to FIG. 5, when the signal transmitted from the updating device 2 does not correspond to any one of signals in steps S41, S44, S47, and S50, an error sent back to the updating device 2 in step S53, the interrupt process is ended in step S54.

In reception of the error reply, although not shown, for example, the updating device 2 can also perform the same process as that performed when the checksums do not coincide with each other in step S25.

In this embodiment, an updating process means for updating a control program stored in an electrically programmable nonvolatile memory into an updating program stored in an external updating device is arranged, the updating process means erases the program in the nonvolatile memory and then performs a writing process to the first memory area, i.e., the memory area 33. Only when the writing process is correctly executed, a writing process is executed to the second memory area, i.e., the reset vector area 33a, in which the minimum control program which is required to cause the control device to arithmetically process a normal control amount. For this reason, the control program can be updated without removing the nonvolatile memory, i.e., a ROM. In addition, when writing defect occurs due to some factor, after data in the memory is erased, part of the control program first written is in the memory. Thereafter, only when the part of the control program first written is correctly written, the remaining part (i.e., the minimum part of the control program which is required to normally operate the control device) is written. More specifically, if the part of the control program intended to be written first cannot be correctly written, the remaining part (i.e., the minimum control program required to normally operate the control device) is not written. For this reason, the writing defect can be easily detected in the step following the updating step, and defective products can be prevented from being issued to the market.

Embodiment 2

Embodiment 1 has described a case wherein the reset vector area 33a is used as a remaining part of the control program (write data D2)(i.e., an area in which the minimum control program which is required to cause the engine control device to arithmetically process a normal control amount). However, the present invention is not limited to this embodiment, and, as the above remaining part designated in the memory area 33a, a vector address area for designating a jump destination when various interrupts such as the SCI occur may be used.

In Embodiment 1, fuel injection control, which is typical of engine controls, has been described. However, an input/output signal may also perform ignition control and idling speed control for controlling an amount of air for idling.

Furthermore, in Embodiment 1, a case in which the present invention is applied to an engine control device has been described. However, the present invention is not limited to this arrangement, and the present invention can also be similarly applied to other vehicle control devices such as a transmission control device and a power steering control device.

What is claimed is:

1. An apparatus for updating a memory with a vehicle control program, wherein said memory has memory locations for storing said vehicle control program, said apparatus comprising:

a vehicle control program adapted to perform an arithmetic process, on the basis of a vehicle drive state, to output a vehicle control amount;

said vehicle control program comprising a part of said vehicle control program to be written first, and a remaining part of said vehicle control program, wherein said part to be written first defines first write data, and said remaining part defines second write data;

means for erasing said memory locations;

first writing means for writing, after said means for erasing erases said memory locations, in one or more of said memory locations, said first write data, said one or more of said memory locations defining a first set of said memory locations;

collating means for making a determination whether said writing of said first write data was abnormally performed; and second writing means for writing, only when said determination indicates said writing of said first write data was not abnormally performed, said second write data in a second set of said memory locations, one or more of said second memory locations being different from said first set of said memory locations;

wherein, when said determination indicates said writing of said first write data was abnormally performed, said second writing means does not write said second write data in said second set of said memory locations.

2. The apparatus for updating a vehicle control program in a memory, as a set forth in claim 1, wherein:

said first set of memory locations define a first contiguous memory area for storing said part of said vehicle control program to be written first;

said second set of memory locations define a second contiguous memory area for storing said remaining part of said vehicle control program;

said vehicle control program requires the presence of said remaining part of said vehicle control program in order to perform said arithmetic process in a manner that outputs said vehicle control amount with a normal value; and said collation means makes said determination by comparing a value determined based on said writing of said first write data with an expected value.

3. The apparatus for updating a vehicle control program in a memory, as set forth in claim 2, wherein said value determined based on said writing of said first write data is a checksum of program codes written in said first set of memory locations, and wherein said expected value is a checksum of program codes of said first write data.

4. The apparatus for updating a vehicle control program in a memory, as set forth in claim 2, wherein said second contiguous memory area is a memory area in which execution of said vehicle control program is started first.

5. The apparatus for updating a vehicle control program in a memory, as set forth in claim 2, wherein said memory having said memory locations is an electrically programmable nonvolatile memory.

6. The apparatus for updating a vehicle control program in a memory, as set forth in claim 1, further comprising said memory being a component of a vehicle control device, and wherein said first write data and said second write data are written to said memory from a device external to said vehicle control device containing said memory, and wherein said writing of said first write data and said writing of said second write data are performed in response to a command received external to said vehicle control device.

7. The apparatus for updating a vehicle control program in a memory, as set forth in claim 1, wherein said memory having said memory locations is an electrically programmable nonvolatile memory.

8. A method of storing a vehicle control program in a memory, wherein said memory has memory locations for storing said vehicle control program, said method comprising:

providing a vehicle control program adapted to perform an arithmetic process, on the basis of a vehicle drive state, to output a vehicle control amount;

determining, for said vehicle control program, a part of said vehicle control program to be written first, and a remaining part of said vehicle control program, wherein said part to be written first defines first write data, and said remaining part defines second write data;

erasing said memory locations; then writing, in one or more of said memory locations, said first write data, said one or more of said memory locations defining a first set of said memory locations; then making a determination whether said writing of said first write data was abnormally performed; and only when said determination indicates said writing of said first write data was not abnormally performed, writing said second write data in a second set of said memory locations, one or more of said second memory locations being different from said first set of said memory locations.

9. The method of storing a vehicle control program in a memory, as a set forth in claim 8, wherein:

said first set of memory locations define a first contiguous memory area for storing said part of said vehicle control program to be written first;

said second set of memory locations define a second contiguous memory area for storing said remaining part of said vehicle control program;

said remaining part of said vehicle control program is required by said vehicle control program to perform said arithmetic process to output said vehicle control amount with a normal value;

said vehicle control program requires the presence of said remaining part of said vehicle control program in order to perform said arithmetic process in a manner that outputs said vehicle control amount with a normal value; and said determination is performed by comparing a value determined based on said writing of said first write data with an expected value.

10. The method of storing a vehicle control program in a memory, as set forth in claim 9, wherein said value determined based on said writing of said first write data is a checksum of program codes written in said first set of memory locations, and wherein said expected value is a checksum of program codes of said first write data.

11. The method of storing a vehicle control program in a memory, as set forth in claim 9, wherein said second contiguous memory area is a memory area in which execution of said vehicle control program is started first.

12. The method of storing a vehicle control program in a memory, as set forth in claim 9, wherein said memory having said memory locations is an electrically programmable nonvolatile memory.

13. The method of storing a vehicle control program in a memory, as set forth in claim 8, wherein said first write data and said second write data are written to said memory from a device external to a vehicle control device containing said memory, and wherein said writing of said first write data and said writing of said second write data are performed in response to a command received external to said vehicle control device.

14. The method of storing a vehicle control program in a memory, as set forth in claim 8, wherein said memory having said memory locations is an electrically programmable nonvolatile memory.

* * * * *